(12) United States Patent
Soong et al.

(10) Patent No.: US 9,917,674 B2
(45) Date of Patent: *Mar. 13, 2018

(54) SYSTEM AND METHOD FOR ADAPTING CODE RATE

(71) Applicant: Futurewei Technologies, Inc., Plano, TX (US)

(72) Inventors: Anthony C. K. Soong, Plano, TX (US); Philippe Sartori, Plainfield, IL (US); Brian Classon, Palatine, IL (US); Zhongfeng Li, Shanghai (CN); Zhengwei Gong, Shanghai (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,259

(22) Filed: Oct. 27, 2016

(65) Prior Publication Data
US 2017/0048019 A1 Feb. 16, 2017

Related U.S. Application Data

(63) Continuation of application No. 14/555,286, filed on Nov. 26, 2014, now Pat. No. 9,509,467, which is a
(Continued)

(51) Int. Cl.
*H04B 7/14* (2006.01)
*H04W 4/00* (2009.01)
(Continued)

(52) U.S. Cl.
CPC ....... *H04L 1/0002* (2013.01); *H04B 7/15542* (2013.01); *H04L 1/0013* (2013.01);
(Continued)

(58) Field of Classification Search
CPC ... H04L 1/0002; H04L 1/0013; H04L 5/0044; H04L 5/0094; H04L 1/0067;
(Continued)

(56) References Cited

U.S. PATENT DOCUMENTS

2003/0026198 A1  2/2003  Diepstraten et al.
2006/0062167 A1  3/2006  Golitschek et al.
(Continued)

FOREIGN PATENT DOCUMENTS

CN  101137091 A  3/2008
CN  101405981 A  4/2009
(Continued)

OTHER PUBLICATIONS

3rd Generation Partnership Project; Technical Specification Group Radio Access Network; Evolved Universal Terrestrial Radio Access (E-UTRA); Base Station (BS) radio transmission and reception (Release 8), 3GPP TS 36.104, V8.7.0, Sep. 2009, 75 pages.
(Continued)

*Primary Examiner* — Kiet Tang
(74) *Attorney, Agent, or Firm* — Slater Matsil, LLP

(57) ABSTRACT

A system and method for adapting code rate are provided. A method for a first communication device to transmit a resource assignment to at least one communication device includes assigning at least one transmission resource to transmit the resource assignment, adapting a code rate of an encoded payload based on the at least one transmission resource and a threshold, thereby producing an adapted payload, and transmitting the adapted payload.

21 Claims, 14 Drawing Sheets

Related U.S. Application Data continuation of application No. 13/165,244, filed on Jun. 21, 2011, now Pat. No. 8,953,517.

(60) Provisional application No. 61/357,840, filed on Jun. 23, 2010.

(51) Int. Cl.

| | | |
|---|---|---|
| *H04B 7/212* | (2006.01) | |
| *H04L 1/00* | (2006.01) | |
| *H04W 72/04* | (2009.01) | |
| *H04L 5/00* | (2006.01) | |
| *H04B 7/155* | (2006.01) | |
| *H04W 4/12* | (2009.01) | |

(52) U.S. Cl.
CPC .......... *H04L 1/0067* (2013.01); *H04L 5/0044* (2013.01); *H04L 5/0094* (2013.01); *H04W 4/12* (2013.01); *H04W 72/042* (2013.01); *H04W 72/044* (2013.01)

(58) Field of Classification Search
CPC ... H04W 72/044; H04W 4/12; H04W 72/042; H04B 7/15542
See application file for complete search history.

(56) References Cited

U.S. PATENT DOCUMENTS

| | | |
|---|---|---|
| 2007/0268814 A1 | 11/2007 | Li |
| 2008/0056173 A1* | 3/2008 | Watanabe ............. H04L 1/1628 370/315 |
| 2008/0273479 A1 | 11/2008 | Kwak et al. |
| 2008/0307427 A1 | 12/2008 | Pi et al. |
| 2009/0003274 A1 | 1/2009 | Kwak et al. |
| 2009/0073922 A1 | 3/2009 | Malladi et al. |
| 2009/0232238 A1 | 9/2009 | Ahmed et al. |
| 2009/0245194 A1 | 10/2009 | Damnjanovic et al. |
| 2009/0296629 A1* | 12/2009 | Lincoln ............. H04B 7/18589 370/321 |
| 2010/0027488 A1 | 2/2010 | Chun et al. |
| 2010/0061345 A1 | 3/2010 | Wengerter et al. |
| 2010/0098045 A1 | 4/2010 | Miyazaki |
| 2010/0103901 A1 | 4/2010 | Nobuhiko et al. |
| 2010/0113043 A1 | 5/2010 | Hsuan et al. |
| 2010/0118800 A1 | 5/2010 | Kim et al. |
| 2010/0281323 A1 | 11/2010 | Wang et al. |
| 2011/0085508 A1* | 4/2011 | Wengerter ............. H04L 5/0094 370/329 |
| 2011/0194500 A1 | 8/2011 | Kim et al. |
| 2011/0194501 A1 | 8/2011 | Chung et al. |
| 2011/0310837 A1 | 12/2011 | Classon et al. |
| 2012/0093017 A1 | 4/2012 | Liu et al. |

FOREIGN PATENT DOCUMENTS

| | | |
|---|---|---|
| CN | 101547179 A | 9/2009 |
| EP | 2341679 A2 | 7/2011 |
| RU | 2378760 C2 | 1/2010 |
| WO | 2007070056 A1 | 6/2007 |
| WO | 2009154839 A2 | 12/2009 |
| WO | 2010044564 A2 | 4/2010 |
| WO | 2010044632 A2 | 4/2010 |
| WO | 2010049007 A1 | 5/2010 |
| WO | 2010042234 A1 | 4/2014 |
| WO | 2009127141 A1 | 10/2014 |

OTHER PUBLICATIONS

3rd Generation Partnership Project; Technical Specification Group Radio Access Network; Evolved Universal Terrestrial Radio Access (E-UTRA); Further advancements for E-UTRA physical layer aspects (Release 9), 3GPP TR 36.814, V9.0.0, Mar. 2010, 104 pages.

Hosein, P., "Resource Allocation for the LTE Physical Downlink Control Channel," IEEE Conference Publications, Globecom Workshops, Nov. 30-Dec. 4, 2009, pp. 1-5.

Huawei, "Frequency diversity techniques and rate-matching for R-PDCCH," 3GPP TSG RAN WG1 Meeting #61, R1-103123, May 10-14, 2010, 6 pages, Montreal, Canada.

Huawei, "Rate matching techniques for R-PDCCH," 3GPP TSG RAN WG1 Meeting #61bis, R1-103899, Dresden, Germany, Jun. 28-Jul. 2, 2010, 5 pages.

Panasonic, "R-PDCCH placement," 3GPP TSG RAN WG1 Meeting #60bis, R1-102042, Agenda Item: 6.6.1.2 Backhaul control channel design, Apr. 12-16, 2010, 5 pages.

Zte, et al., "Wf on R-PDCCH Interleaving with CRS," TSG-RAN WG1 Meeting #61, R1-103426, May 10-14, 2010, 2 pages, Montreal, Canada.

Huawei, "Resource allocation for R-PDCCH," 3GPP TSG RAN MG1 Meeting #61bis, R1-103898, Dresden, Germany, Jun. 28-Jul. 2, 2010, 2 pages.

* cited by examiner

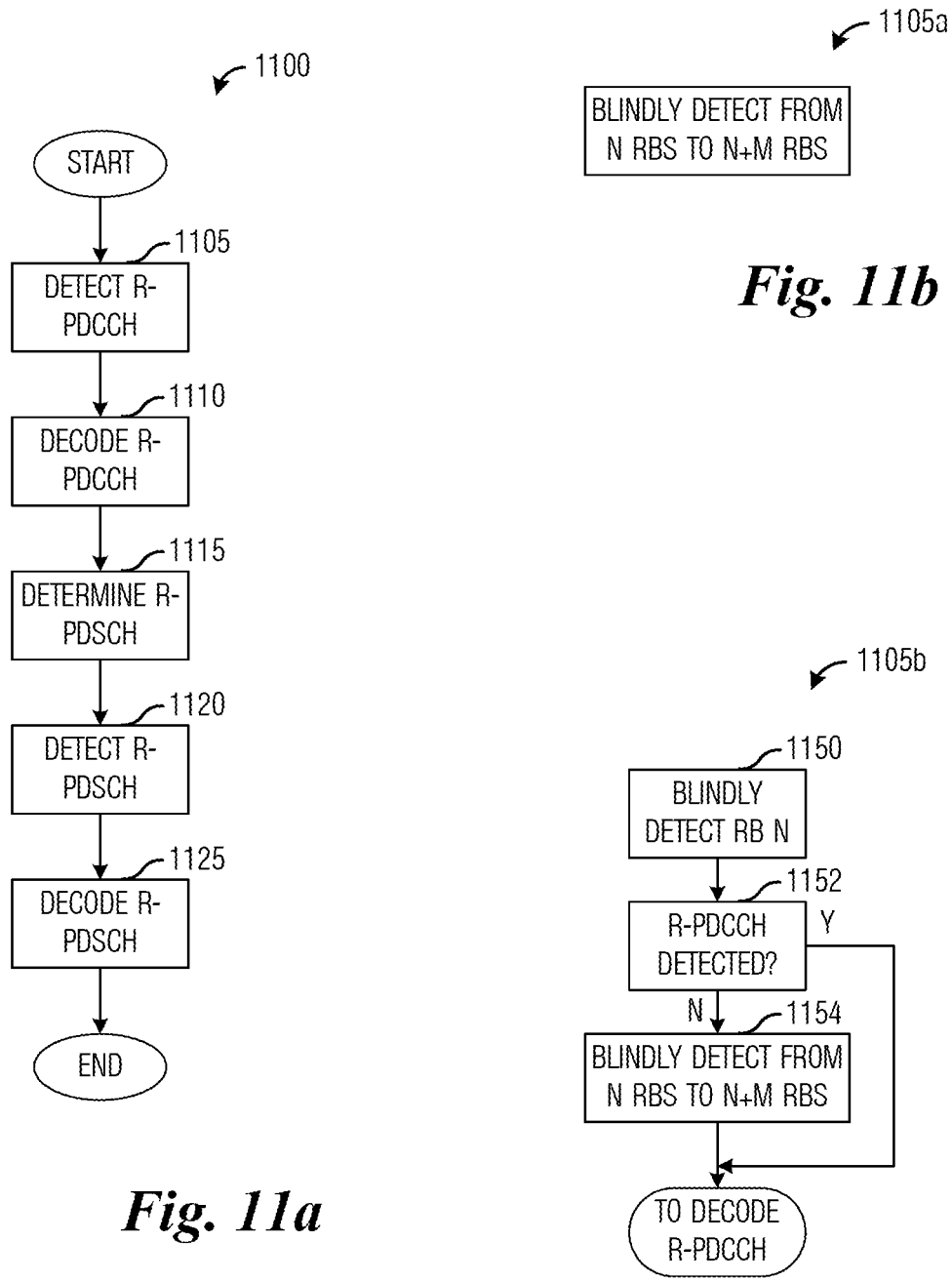

SYSTEM AND METHOD FOR ADAPTING CODE RATE

CROSS-REFERENCE TO RELATED APPLICATIONS

This application is a continuation of U.S. patent application Ser. No. 14/555,286, entitled "System and Method for Adapting Code Rate," filed on Nov. 26, 2014, which is a continuation of U.S. patent application Ser. No. 13/165,244, (now U.S. Pat. No. 8,953,517, issued on Feb. 10, 2015) entitled "System and Method for Adapting Code Rate," filed on Jun. 21, 2011, which claims the benefit of U.S. Provisional Patent Application No. 61/357,840, filed on Jun. 23, 2010, entitled "Rate-Matching Techniques for R-PDCCH," all of which applications are hereby incorporated herein by reference.

TECHNICAL FIELD

The present invention relates generally to digital communications, and more particularly to a system and method for adapting code rate.

BACKGROUND

Generally, it is desirable to fully occupy resources assigned for a transmission. The unused resources mean that the assigned resources are wasted, thereby reducing communications system efficiency. Inefficiently used resources may consume resources that may otherwise be assigned to other transmissions and reduce a number of users supported in the communications system, data rate of the communications system, reliability of the communications system, and so forth.

Furthermore, due to the unused resources, the transmission may be transmitted at a lower code rate than possible if all of the assigned resources are used. Thereby making the transmission more prone to errors than need be.

SUMMARY

These and other problems are generally solved or circumvented, and technical advantages are generally achieved, by example embodiments of the present invention which provide a system and method for adapting code rate.

In accordance with an example embodiment of the present invention, a method for a first communication device to transmit a resource assignment to at least one communication device is provided. The method includes assigning at least one transmission resource to transmit the resource assignment, adapting a code rate of an encoded payload based on the at least one transmission resource and a threshold, thereby producing an adapted payload, and transmitting the adapted payload.

In accordance with another example embodiment of the present invention, a communications device is provided. The communications device includes an adaptation unit, and a transmitter coupled to the adaptation unit. The adaptation unit adapts a code rate of an encoded payload based on at least one transmission resource and a threshold, thereby producing an adapted payload, where the at least one transmission resource is used to transmit the adapted payload. The transmitter transmits the adapted payload.

In accordance with another example embodiment of the present invention, a method for communications device operations is provided. The method includes determining if a first transmission has been detected in a first control region, where the first transmission includes an encoded payload that has been adaptively rate matched based on at least one transmission resource and a threshold, and where the at least one transmission resource is used to transmit the adaptively rate matched payload. The method also includes decoding the detected first transmission to determine a location of a second transmission if the first transmission has been detected in the first control region, where the first transmission is determined to have not been transmitted if the first transmission has not been detected.

In accordance with another example embodiment of the present invention, a method for a base station to transmit a resource assignment to a plurality of remote wireless nodes is provided. The method includes allocating at least one resource block for a control channel transmission, where the control channel transmission includes the resource assignment. The method also includes selecting a code rate for the control channel transmission so that when encoded, an encoded control channel transmission fully occupies the at least one resource block, and transmitting the encoded control channel transmission.

In accordance with another example embodiment of the present invention, a method for relay node operations is provided. The method includes determining if a first transmission has been detected in a first control region, where the first transmission includes an encoded payload that was rate matched to ensure that the first transmission is substantially fully occupied. The method also includes decoding the detected first transmission to determine a location of a second transmission if the first transmission has been detected in the first control region, where the first transmission is determined to have not been transmitted if the first transmission has not been detected.

One advantage disclosed herein is that the code rate of a transmission may be adjusted to more efficiently utilize resources to meet performance requirements. As an example, if better error performance is desired, the code rate of the transmission may be increased. While if communications system conditions are relatively error-free, the code rate of the transmission may be decreased to free up more resources to support other transmissions.

A further advantage of exemplary embodiments is that a technique for detecting the adapted transmission is provided which may simplify the detection of the adapted transmission without placing too much burden on a receiving communications device.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 7c-1 and 7c-2 illustrate example diagrams of rate matching up techniques according to example embodiments described herein;

FIG. 11a illustrates an example flow diagram of relay node (RN) operations in decoding a transmission according to example embodiments described herein;

FIGS. 11b through 11e illustrate example diagrams of detecting techniques according to example embodiments described herein;

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a Third Generation Partnership Project (3GPP) Long Term Evolution (LTE) compliant communications system supporting relay nodes (RN). The invention may also be applied, however, to other communications systems that supports or does not support RNs but allows for transmissions at different code rates, such as communications systems that are compliant with the WiMAX, IEEE 802.16, 3GPP LTE-Advanced, and so forth, technical standards as well as those that are not compliant to a technical standard.

Figure 1:
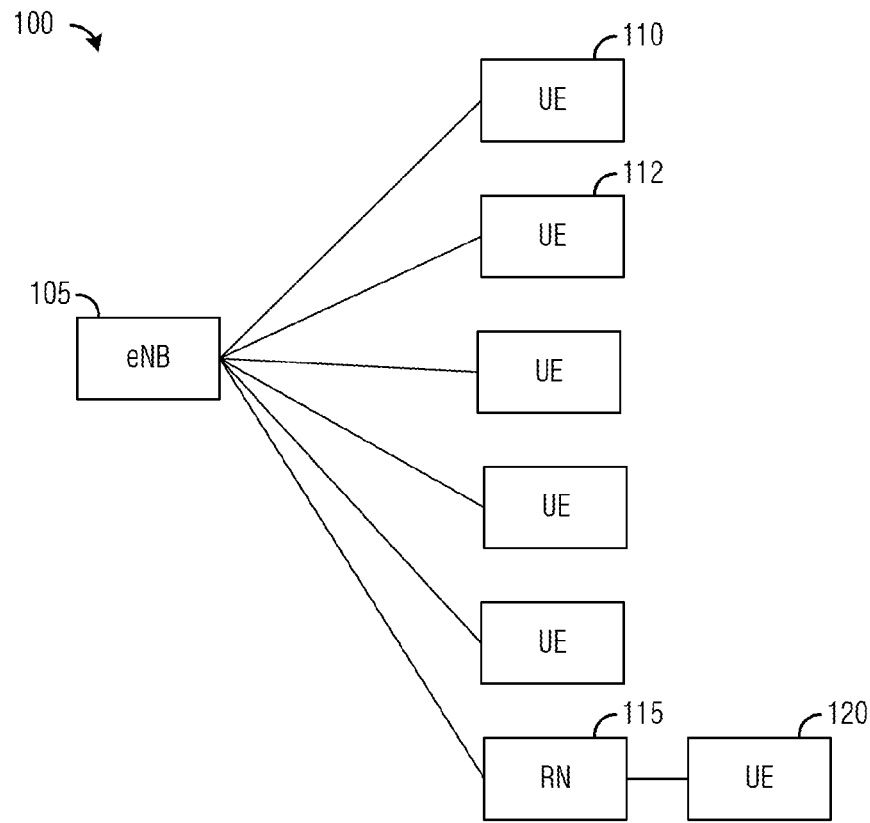
FIG. 1 illustrates an example communications system according to example embodiments described herein.

FIG. 1 illustrates a communications system 100. Communications system 100 includes an enhanced NodeB (eNB) 105, which may also be commonly referred to as a controller, a communications controller, a base station, a NodeB, and so on. Communications system 100 also includes a plurality of User Equipment (UE), such as UE 110, 112, and 120. A UE may also be commonly referred to as a mobile, mobile station, subscriber, user, terminal, and so forth. In addition, the communication system may include other entities such as Relay Node (RN) 115. The RN may serve one or more UEs, such as UE 120.

A communication link between the eNB and the RN is referred to as a Un link, or backhaul link. A communication link between the eNB and the UE, or the RN and the UE is referred to as a Uu link, or access link. Communications between eNB 105 and a given UE, or between RN 115 and a UE, such as UE 120, may occur over a link that comprises a Uu downlink (DL) channel and a Uu uplink (UL) channel. Similarly, communications between eNB 105 and RN 115 may occur over a link that comprises a Un downlink (DL) and a Un uplink (UL).

UEs not directly served by the RNs and the RNs are multiplexed together and are allocated different RBs. In other words, the Un and Uu links may be frequency-multiplexed, in addition to time-multiplexed. For 3GPP LTE Release-10, the UE resource assignments are transmitted on the PDCCH, while the RN resource assignments for the backhaul link may be transmitted on the R-PDCCH.

Figure 2:
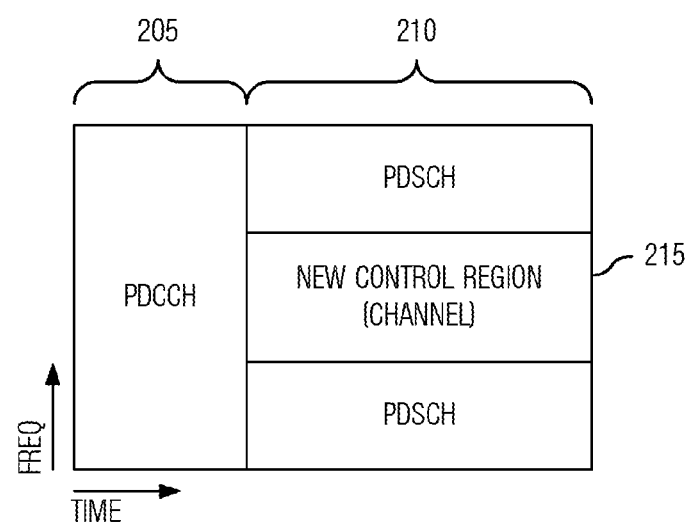
FIG. 2 illustrates an example subframe according to example embodiments described herein.

FIG. 2 illustrates a subframe 200. Subframe 200 comprises a first control region 205 and a data region 210. Subframe 200 shows an example for a multicarrier modulation system. As discussed above, the first control region 205 may include control signaling, such as a PDCCH, while data region 210 may include data as well as control signaling, which may include the R-PDCCH, as well as new control channels, such as a U-PHICH or a U-PDCCH. Note that the representation on FIG. 2 is in the logical domain, and may not necessarily map with actual allocated physical resources.

First control region 205 may also be called a PDCCH control region. The control channels are located in a second control region 215, which may be inside data region 210. Second control region 215 may comprise the R-PDCCH, as well as an extension for UEs (also called the U-PDCCH control region). As shown in FIG. 2, second control region 215 is located in data region 210, while PDCCH is located in first control region 205.

The representation of the various channels and regions in FIG. 2 is logical in nature with no direct relationship to an actual mapping of specific physical resources. In particular, the resources comprising second control region 215 may be distributed in frequency and are not restricted to be contiguous in frequency. Second control region 215 may also be time multiplexed with data, and for instance, may occupy only the first or the second slot of a subframe. In addition, second control region 215 may not necessarily start immediately after first control region 205, but may be offset by one or more symbols. Second control region 215 may consist of Physical RBs (PRBs) or Virtual RBs (VRBs), either localized or distributed.

In 3GPP LTE compliant communications systems, R-PDCCHs can be either cross interleaved or not cross-interleaved. With cross interleaving, a set of two or more R-PDCCH may be multiplexed together. Each of the R-PDCCHs in the set is transmitted on an aggregation of one or several consecutive control channel elements (CCEs), where a control channel element corresponds to a number, for example, nine, resource element groups (REG). The REGs for various R-PDCCHs are multiplexed and interleaved together. With no cross-interleaving, each R-PDCCH is transmitted separately on the assigned resources for that R-PDCCH.

Although the discussion presented herein focuses on control channels for RNs, the example embodiments presented herein are also applicable to other control channels, such as control channels for UEs (including PDCCH, and so on). Therefore, the discussion of RN control channels should not be construed as being limiting to either the scope or the spirit of the example embodiments.

Figures 3A, 3B:
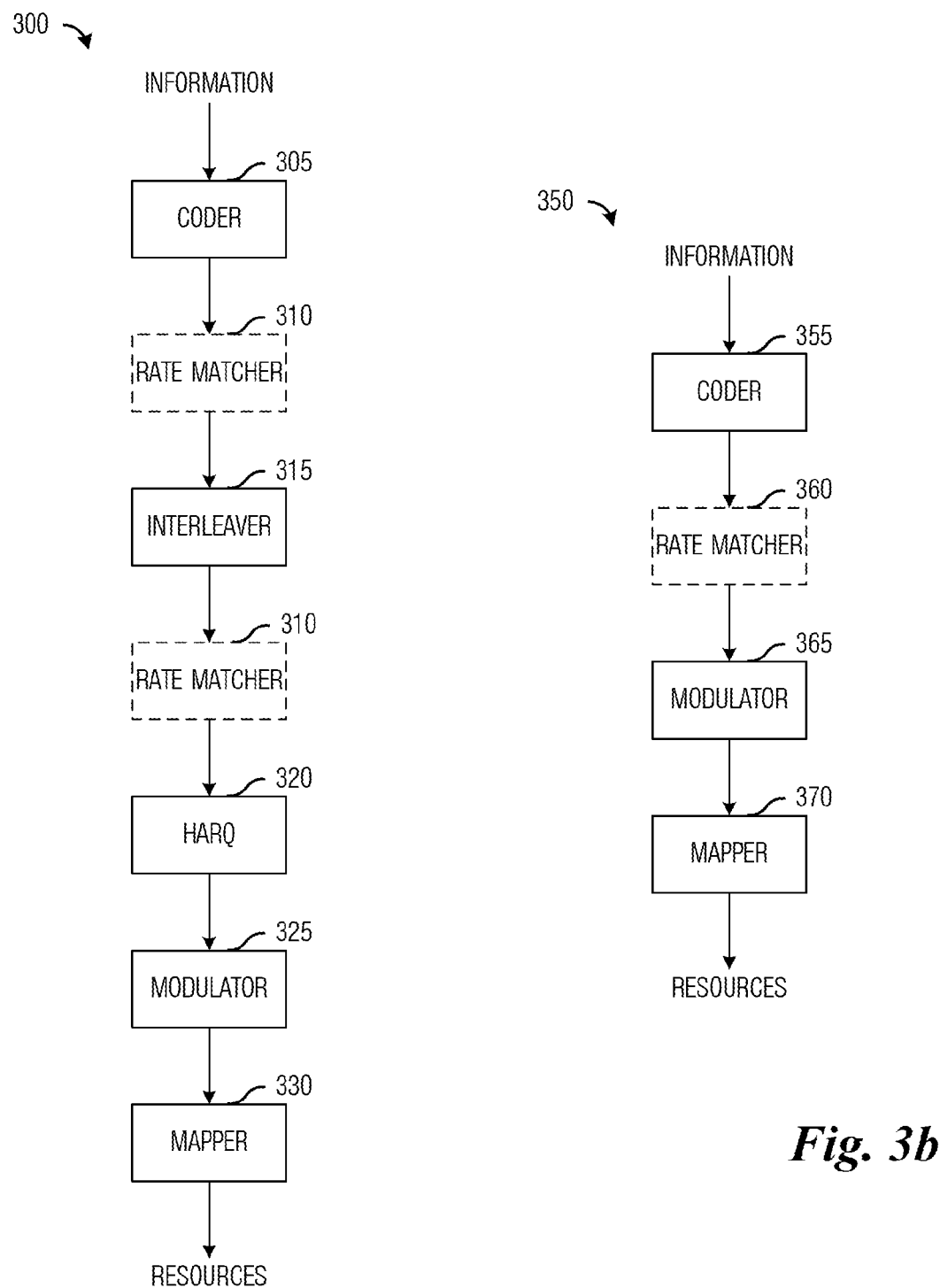
FIG. 3a illustrates an example processing chain of a transmitter with cross-interleaving of a control channel according to example embodiments described herein.
FIG. 3b illustrates an example processing chain of a transmitter without cross-interleaving of a control channel according to example embodiments described herein.

FIG. 3a illustrates a processing chain 300 of a transmitter with cross-interleaving of R-PDCCHs. Processing chain 300 may be illustrative of signal processing applied to information, such as data, control, or a combination thereof, as the information is prepared for transmission by a communications device, such as an eNB, a RN, a UE, or so on, with cross interleaving of control channels, such as Relay Physical Downlink Control Channels (R-PDCCHs), discussed below.

Processing chain 300 includes a coder 305 that may apply a selected channel code to information provided to coder 305. The selected channel code used to encode the information may be based on a modulation and coding scheme (MCS) selected by the communications device, a controller of the communications device, or so on, and may be based on an amount of information to transmit, available communications system resources, desired error protection, and so forth. The encoded information may be interleaved by interleaver 315, which cross-interleave R-PDCCHs.

A rate matcher 310 may be used to adjust a code rate of the encoded information. The adjusting of the code rate may be based on the selected MCS, availability (or lack) of communications system resources, desired error protection, communications system load, and so on. As an example, if there are additional communications system resources available for use, the code rate of the encoded information may be reduced by rate matcher 310 to reduce the code rate of the encoded information. The reduced code rate may allow for greater protection from errors. Similarly, if there is a lack of available communications system resources available for use, the code rate of the encoded information may be increased to allow for more transmissions to take place without requiring additional communications system resources.

According to an example embodiment, rate matching by rate matcher 310 may occur before or after interleaving by interleaver 315. Rate matcher 310 is shown in two locations in processing chain 300. Generally, rate matching may occur at a variety of locations in a processing chain, typically prior to modulation, although rate matching at the symbol level is also possible. Therefore, the illustrative embodiments shown herein with rate matcher 310 occurring before or after interleaving should not be construed as being limiting to either the scope or the spirit of the example embodiments.

Processing chain 300 also includes a hybrid automatic repeat requested (HARQ) unit 320 for data that may be used to generate HARQ acknowledgements (ACK) and/or negative acknowledgements (NACK) for transmission based on decoding of previously received transmissions. In general, if a previously received transmission decoded correctly, then an ACK is generated, while if a previously received transmission decoded incorrectly, then a NACK is generated.

A modulator 325 may be used to modulate the encoded, interleaved, and rate matched information. As an example, modulator 325 may modulate the encoded, interleaved, and rate matched information to one of any QAM, QPSK, or so on, constellation, producing information symbols. A mapper 330 may be used to map the information symbols onto resources.

FIG. 3b illustrates a processing chain 350 of a transmitter. Processing chain 350 may be illustrative of signal processing applied to information, such as data, control, or a combination thereof, as the information is prepared for transmission by a communications device, such as an eNB, a RN, a UE, or so on, without cross interleaving of control channels, such as R-PDCCHs.

Processing chain 350 includes a coder 355 that may apply a selected channel code to information provided to coder 355. The selected channel code used to encode the information may be based on a modulation and coding scheme (MCS) selected by the communications device, a controller of the communications device, or so on, and may be based on an amount of information to transmit, available communications system resources, desired error protection, and so forth.

A rate matcher 360 may be used to adjust a code rate of the encoded information. The adjusting of the code rate may be based on the selected MCS, availability (or lack) of communications system resources, desired error protection, communications system load, and so on. As an example, if there are additional communications system resources available for use, the code rate of the encoded information may be reduced by rate matcher 360 to reduce the code rate of the encoded information. The reduced code rate may allow for greater protection from errors. Similarly, if there is a lack of available communications system resources available for use, the code rate of the encoded information may be increased to allow for more transmissions to take place without requiring additional communications system resources.

A modulator 365 may be used to modulate the encoded, and rate matched information. As an example, modulator 365 may modulate the encoded, and rate matched information to one of any QAM, QPSK, or so on, constellation, producing information symbols. A mapper 370 may be used to map the information symbols onto resources.

For discussion purposes, consider a R-PDCCH for a 3GPP LTE compliant communications system that may be transmitted in several modes: A mode 1: Uses 3GPP LTE Release-8 type of REG level interleaving across different R-PDCCHs in a physical resource block (PRB), with separate interleaving for UL grants and DL grants. Although the REG definition applies to DL only for LTE rel-10, the concept may be extended to UL.

While a mode 2: Uses no interleaving across different R-PDCCHs in a PRB.

Both modes may be supported with a cell-specific reference signal (CRS) used for demodulation. Also, UE-specific reference signals (DMRS) may be used for the non-interleaving mode.

Figure 4:
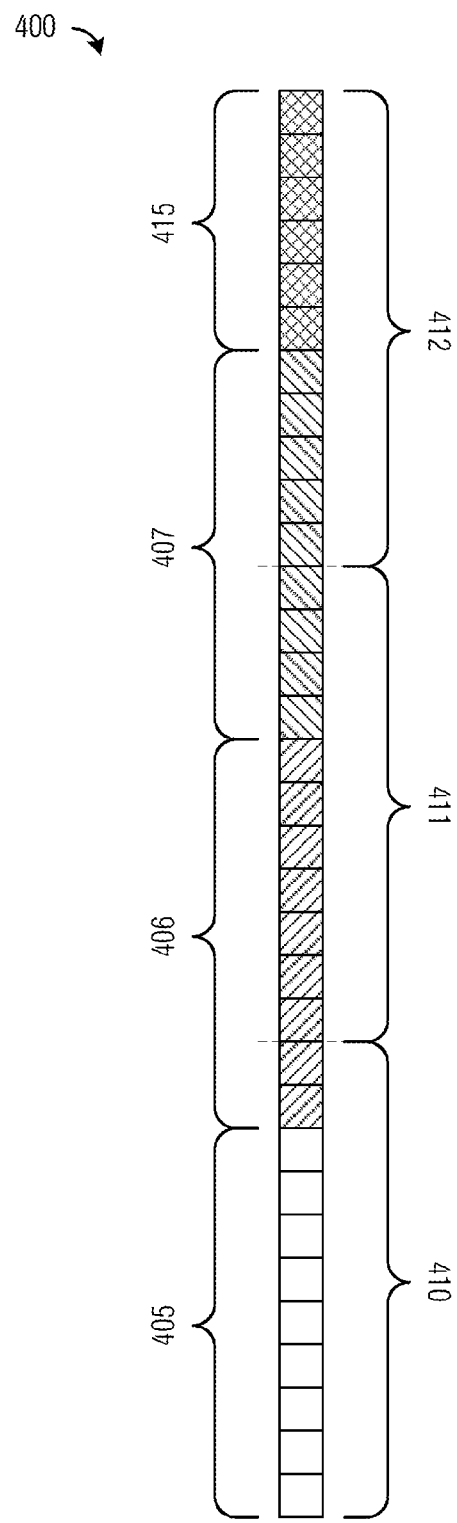
FIG. 4 illustrates an example diagram of resource element groups (REG) in allocated resource blocks (RB) according to example embodiments described herein.

FIG. 4 illustrates a diagram 400 of resource element groups (REG) in allocated resource blocks (RB). As shown in FIG. 4, the REs for REGs that are used for R-PDCCH transmission do not include the REs that not available to REGs that are used for R-PDCCH transmission, e.g., REs used for reference symbol (RS) transmission. Whether the RS related REs are excluded depends on the RS configuration (e.g., CSI-RS configuration or DMRS configuration). For discussion purposes, consider a situation wherein R-PDCCHs are cross-interleaved. Then, the REs for REGs may not include REs used for RS (e.g., CSI-RS, DMRS, and so on) transmission and assignment granularity for the R-PDCCHs is a single CCE with one CCE being equal to nine REGs. While in a situation wherein R-PDCCHs are not cross-interleaved. In such a situation, there is no REG concept and assignment granularity is a single RB. The REs in the RB for the R-PDCCH may exclude the REs used for RS (e.g., CSI-RS, DMRS, and so forth) transmission.

Using CRS based demodulation may be used for the R-PDCCH. When using CRS, to further improve performance, it may be logical to use interleaving with other R-PDCCH in order to attain a degree of diversity. However, some resources may be wasted if the R-PDCCH after coding does not fully occupy all REs of the assigned RBs. Similarly, resources may be wasted for non-interleaved R-PDCCH (sometimes referred to as RN specific R-PDCCH) or frequency selective/scheduling R-PDCCH.

Without loss of generality, consider a DL grant allocation with interleaving in a first slot with the following as assumptions: 1) only one control channel element (CCE) is allocated to each DL grant, and 2) there are 44 available REs (or 11 REGs) in one RB for a two transmit antenna case. In general, when excluding overhead, a REG comprises four REs. A similar situation is also present with a UL grant allocation in a second slot.

For discussion purposes, assume that three DL grants are needed in the first slot. Therefore, three CCEs are needed, with each CCE being equal to nine REGs for a total of 27 REGs. The three CCEs are shown in FIG. 4 as CCE 405, CCE 406, and CCE 407. Since one RB spans 11 REGs, three RBs (33 REGs) are needed to transmit the three CCEs. The three RBs are shown in FIG. 4 as RB 410, RB 411, and RB 412.

However, three RBs are equal to 33 REGs and only 27 REGs are needed. Therefore, six REGs out of the 33 REGs of the three RBs are not used to transmit the three CCEs. Hence, 6/33 or 18 percent of the REGs allocated for transmitting the three CCEs are wasted. The wasted REGs are shown in FIG. 4 as REG set 415. Table 1 illustrates the resource waste for a number of different CCEs in a R-PDCCH. As shown in Table 1, the amount of resource waste may range from about two percent up to more than 50 percent.

TABLE 1

| Resource waste for R-PDCCH | | | | |
|---|---|---|---|---|
| R-PDCCH | Required CCEs | Required RBs | Resource waste | Amount punctured |
| 1st slot | 1 (=9REG) | 1 (=11REG) | 53% (2/19) | N/A |
| | 2 (=18REG) | 2 (=22REG) | 18% (4/22) | 39% (7/18) |

TABLE 1-continued

| Resource waste for R-PDCCH | | | | |
|---|---|---|---|---|
| R-PDCCH | Required CCEs | Required RBs | Resource waste | Amount punctured |
| | 3 (=27REG) | 3 (=33REG) | 18% (6/33) | 19% (5/27) |
| | 4 (=36REG) | 4 (=44REG) | 18% (8/44) | 8% (3/36) |
| | 5 (=45REG) | 5 (=55REG) | 18% (10/55) | 2% (1/45) |
| | 6 (=54REG) | 5 (=55REG) | 2% (1/54) | 18% (10/54) |
| | 7 (=63REG) | 6 (=66REG) | 5% (3/66) | 13% (8/63) |
| | ... | ... | ... | ... |
| | 15 (=135REG) | 13 (=143REG) | 11% (8/143) | 2% (2/132) |
| 2nd slot | 1 (=9REG) | 1 (=19REG) | 53% (10/19) | N/A |
| | 2 (=18REG) | 1 (=19REG) | 5% (1/19) | N/A |
| | 3 (=27REG) | 2 (=38REG) | 28% (11/38) | 22% (8/27) |
| | 4 (=36REG) | 2 (=38REG) | 5% (2/38) | 47% (17/36) |
| | 5 (=45REG) | 3 (=57REG) | 21% (12/57) | 16% (7/45) |
| | 6 (=54REG) | 3 (=57REG) | 5% (3/57) | 30% (16/54) |
| | 7 (=63REG) | 4 (=76REG) | 17% (13/76) | 10% (6/63) |
| | ... | ... | ... | ... |
| | 11 (=99REG) | 6 (=114REG) | 13% (15/114) | 4% (4/99) |
| | ... | ... | ... | ... |
| | 15 (=135REG) | 8 (=152REG) | 11% (17/152) | 1% (2/135) |

In general, there are several different ways to adapt (i.e., rate match) the code rate of the encoded information to ensure that all of the allocated resources are used. A first way to adapt the code rate may be to increase the code rate of the encoded information to reduce the number of resources needed to transmit the encoded information. Increasing the code rate may be referred to as a rate matching down. A second way to adapt the code rate may be to decrease the code rate of the encoded information by increasing the number of resources needed to transmit the encoded information. Decreasing the code rate may be referred to as a rate matching up.

According to an example embodiment, a decision on how to adapt the code rate of the encoded information may be based on a desired performance level of a communications system. For example, in a heavily loaded communications system, there may be a desire to support the transmission of more encoded information. Therefore, it may be desirable to rate match down the code rate to increase the code rate of the encoded information to allow more transmissions to take place. Alternatively, in a lightly loaded communications system, a lower code rate (resulting from rate matching up the code rate to decrease the code rate of the encoded information) may be desirable to improve error performance of the transmissions.

According to an example embodiment, a decision on how to adapt the code rate of the encoded information may be based on how much adaptation needs to be performed. As an example, consider a case wherein the encoded information may be rate matching up by nine REGs to fill all of the REGs of the allocated RBs or rate matching down by two REGS to fill all of the REGs of one less RB than the allocated RBs. Then, it may be more beneficial to perform a rate matching down since the code rate of the encoded information may not be significantly impacted while providing a free RB that may be allocated to another transmission. Therefore, it may be preferred to perform a rate matching down if the impact on the code rate is small.

Figure 5:
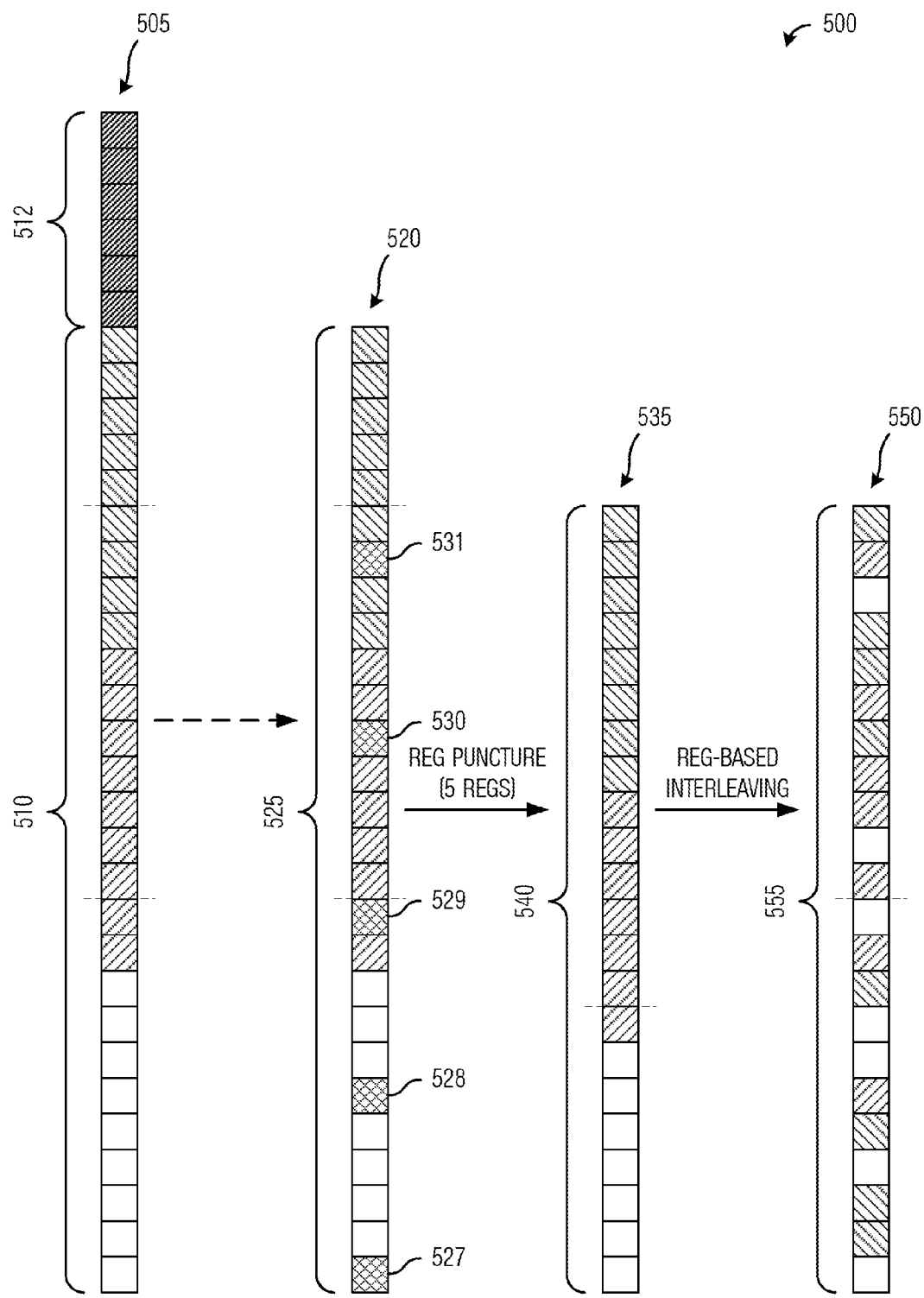
FIG. 5 illustrates an example diagram of an adaptation of the code rate of encoded information, wherein the adaptation comprises rate matching down and occurs prior to interleaving according to example embodiments described herein.

FIG. 5 illustrates a diagram 500 of an adaptation of the code rate of encoded information, wherein the adaptation comprises rate matching down and occurs prior to interleaving. For discussion purposes, consider an illustrative example of three CCEs (27 REGs) being transmitted on three allocated RBs (33 REGs). FIG. 5 illustrates a sequence of blocks 505 that includes a first group of REGs 510, where group of REGs 510 includes 27 REGs. A second group of REGs 512 includes six REGs out of the 33 REGs in the three RBs that are not allocated to the three CCEs.

Since the 27 REGs in the three CCEs is five more REGs than in two RBs (22 REGs), in order to adapt the code rate by rate matching down, five REGs may need to be punctured (removed) in order to reduce the total number of REGs in the three CCEs down to 22 REGs, which is equal to two RBs. FIG. 5 also illustrates a sequence of blocks 520 that shows three CCEs 525 formerly with 27 REGs with five REGs punctured, with REGs 527, 528, 529, 530, and 531 being the punctured REGs. While a REG is defined in 3GPP LTE Release-10 as comprising four available REs (when overhead is not considered), the example embodiments may be extended to any REG size, or even variable size REGs.

According to an example embodiment, the REGs selected for puncturing should be as evenly distributed as possible throughout the three CCEs. As shown in sequence of blocks 520, every fifth REG is punctured until five REGs have been punctured. By distributing the puncturing as evenly as possible, the impact of the code rate reduction may be distributed across all of the CCEs, thereby minimizing the impact on any single CCE. The puncturing of the REGs of sequence of blocks 520 represents a single illustrative embodiment. Other puncturing distributions are also possible. Therefore, the discussion of puncturing every fifth REG should not be construed as being limiting to either the scope or the spirit of the example embodiments. Furthermore, while the puncturing is described as occurring at the REG level, the puncturing may be performed at other levels with minor adjustments, such as the RE level.

FIG. 5 also illustrates a sequence of blocks 535. Sequence of blocks 535 may be representative of three CCEs 540 after having five REGs punctured. With five REGs punctured, three CCEs 540 comprises 22 REGs, which is equal to two RBs. Therefore, all of the REGs of two RBs may be fully utilized when transmitting three CCEs 540, resulting in no resource waste.

FIG. 5 also illustrates sequence of blocks 550. Sequence of blocks 550 may be representative of three CCEs 555 after undergoing REG based interleaving. As discussed previously, interleaving may help to improve error performance by reducing a probability of an error damaging adjacent REGs of a single CCE.

Figure 6:
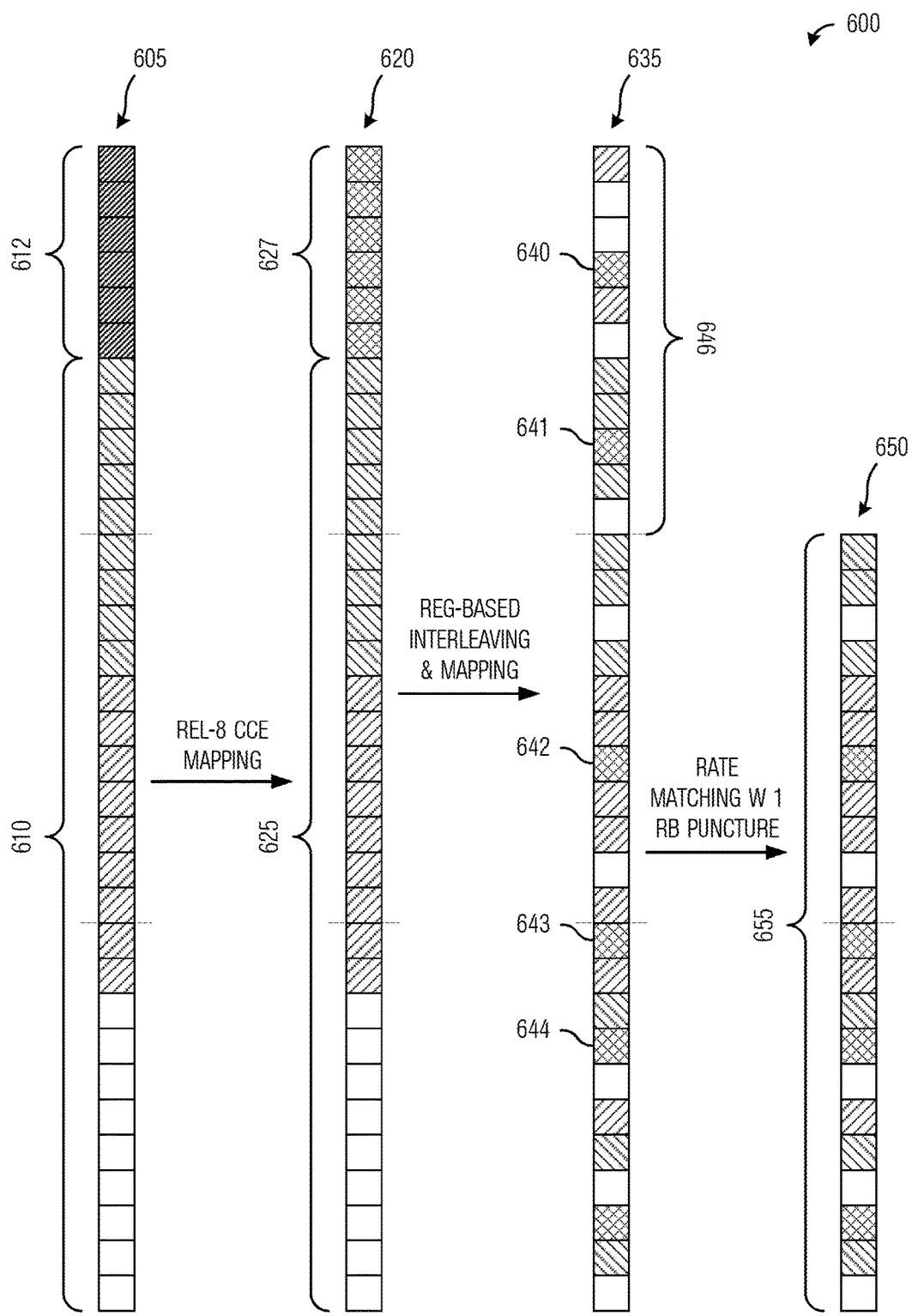
FIG. 6 illustrates an example diagram of an adaptation of the code rate of encoded information, wherein the adaptation comprises rate matching down and occurs after interleaving according to example embodiments described herein.

FIG. 6 illustrates a diagram 600 of an adaptation of the code rate of encoded information, wherein the adaptation comprises rate matching down and occurs after interleaving. For discussion purposes, consider an illustrative example of three CCEs (27 REGs) being transmitted on three allocated RBs (33 REGs). FIG. 6 illustrates a sequence of blocks 605 that includes a first group of REGs 610, where first group of REGs 610 includes 27 REGs. A second group of REGs 612 includes 5 REGs out of the 33 REGs in the three RBs that are not allocated to the three CCEs.

Since the 27 REGs in the three CCEs is five more REGs than in two RBs (22 REGs), in order to adapt the code rate by rate matching down, five REGs may need to be punctured (removed) in order to reduce the total number of REGs in the three CCEs down to 22 REGs, which is equal to two RBs. However, the puncturing may occur after interleaving.

FIG. 6 also illustrates a sequence of blocks 620 that shows a sequence of blocks 625 that may be representative of the REGs of the three CCEs and a sequence of blocks 627 that may be representative of fill REGs. Sequence of blocks 627 may include a sufficient number of fill REGs to bring a total number of REGs (sequence of blocks 625+sequence of blocks 627) to be equal to an integer number of RBs. As shown in FIG. 6, sequence of blocks 625 includes 27 REGs and sequence of blocks 627 includes 6 REGs, therefore, a sum of sequence of blocks 625 and sequence of blocks 627 is equal to 27 REGs+6 REGs=33 REGs=three RBs.

According to an example embodiment, the REGs in sequence of blocks 627 may contain no information or the REGs may be set to a fixed or predefined value. Alternatively, the REGs in sequence of blocks 627 may be filled with information contain in some of the REGs in sequence of blocks 625, wherein the information may be randomly selected from the REGs in sequence of blocks 625. Alternatively, the information may be selected from CCEs wherein the REGs in sequence of blocks 627 will reside after interleaving.

FIG. 6 also illustrates a sequence of blocks 635. Sequence of block 635 may be representative of the REGs of three CCEs and the fill REGs (for example sequence of block 625 and sequence of blocks 627) after interleaving. A combination of the REGs of three CCEs and the fill REGs result in a sufficient number of REGs to fill three RBs. After the interleaving, the fill REGs, such as REG 640, REG 641, REG 642, REG 643, and REG 644, may be distributed substantially evenly throughout sequence of blocks 635. FIG. 6 also illustrates sequence of blocks 646 which may be representative of a single RB's worth of REGs. Sequence of blocks 646 may be REGs of an RB selected for puncturing.

Although one particular RB has been illustrated as having been selected for puncturing, any one of the RBs may have been selected for puncturing. Therefore, the illustration of one particular RB being a puncturing candidate should not be construed as being limiting to either the scope or the spirit of the example embodiments.

FIG. 6 also illustrates sequence of blocks 650. Sequence of blocks 650 may be illustrative of REGs of three CCEs after one RB has been punctured, leaving two RB's worth of REGs. The remaining REGs completely fill two RBs, therefore making full utilization of the resources.

According to an example embodiment, different resource allocation scenarios may require different rate matching techniques. As an example, for the resource allocation scenario shown in FIG. 5, a puncture ratio of one in three (1/3) may be too great and may result in a resource allocation insufficiently robust for adequate R-PDDCH detection performance. A reasonable puncture ratio may need to be defined to assure acceptable performance. Furthermore, the puncture ratio should be set as small as needed to ensure simple detection performance. For example, a maximum puncture ratio $R_{opt}$ may be defined with an acceptable performance loss for R-PDDCH detection, then a decision to perform adaptation by rate matching down can be readily decided by comparing a potential puncture ratio (a puncture ratio of a particular resource allocation scenario) with the maximum puncture ratio $R_{opt}$. As an example, if the potential puncture ratio is less than or equal to the maximum puncture ratio $R_{opt}$, then the potential puncture ratio may occur, while if the potential puncture ratio is greater than the maximum puncture ratio $R_{opt}$, then the potential puncture ratio may not occur.

For discussion purposes, consider a resource allocation for RB-based rate matching, such as shown in FIG. 6. In addition to the allocated $N_A$ RBs (actual resources) for R-PDCCH transmission, a potential number of punctured RBs may be maximized as $M_{max}$ in order to ensure that the puncture ratio satisfies:

$$\begin{cases} \dfrac{M_{max}}{N_A + M_{max}} \le R_{opt} \\ \dfrac{M_{max}+1}{N_A + M_{max}+1} \le R_{opt} \end{cases}$$

Then the maximum number of punctured RBs may be selected as $$M_{max} = \left\lfloor \dfrac{N_A}{1/R_{opt}-1} \right\rfloor.$$

Hence, the eNB and RN will operate all interleaving and de-interleaving related procedures with $N_A+M_{max}$ RBs (required resource) which is the minimal RB number with compact allocation scheme.

A goal of the rate matching (code rate adaptation) algorithm may be to fully occupy (or substantially fully occupy) the available symbols (REs) for the allocated RBs for the R-PDCCH. Fully occupying the available symbols (REs) of the allocated RBs results in better system performance since there is no resource waste: the unoccupied REs within a RB cannot be allocated for transmission of another channel, or to another user. In general, substantially fully occupying the available symbols means that there are fewer than a few percentage (less than 10 or five percent, for example) unoccupied available symbols, for example.

According to an example embodiment, for rate matching down an R-PDCCH, the punctured information may be evenly shared by all RNs. The performance impact on each R-PDCCH will be similar for all R-PDCCHs.

Figure 7A:
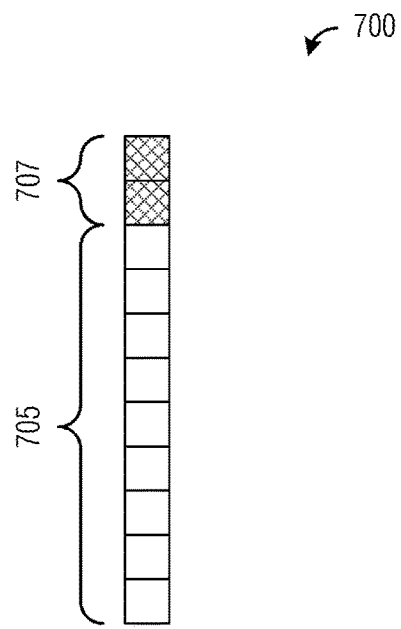
FIG. 7a illustrates an example RB with 11 REGs, wherein a single CCE with 9 REGs (shown as a sequence of blocks) is mapped according to example embodiments described herein.

As discussed previously, the code rate may also be rate matched up as well as rate matched down. For example, for a DL grant with one CCE in a first slot, at least one RB should be allocated. With only a single CCE allocated (9 REGs), then two REGs out of the 11 REGs associated with the single RB may be wasted. FIG. 7a illustrates an RB 700 with 11 REGs, wherein a single CCE with 9 REGs (shown as sequence of blocks 705) is mapped. Therefore, two REGs (shown as sequence of blocks 707) will be wasted. The code rate may be rate matched up to fully occupy (or substantially fully occupy) the RB, thereby increasing the detection performance.

Although the discussion presented herein focuses on the use of a code rate threshold to determine if rate matching is to be performed, other types of thresholds may be used to determine if rate matching is to be performed. For example, a spectral efficiency threshold, a signal to interference plus noise ratio threshold, a signal to noise ratio threshold, and so forth, may be used to determine if rate matching is to be performed. Furthermore, a threshold may be a single value or a range of values. Therefore, the discussion of a code rate threshold should not be construed as being limiting to either the scope or the spirit of the embodiments.

Figure 7B:
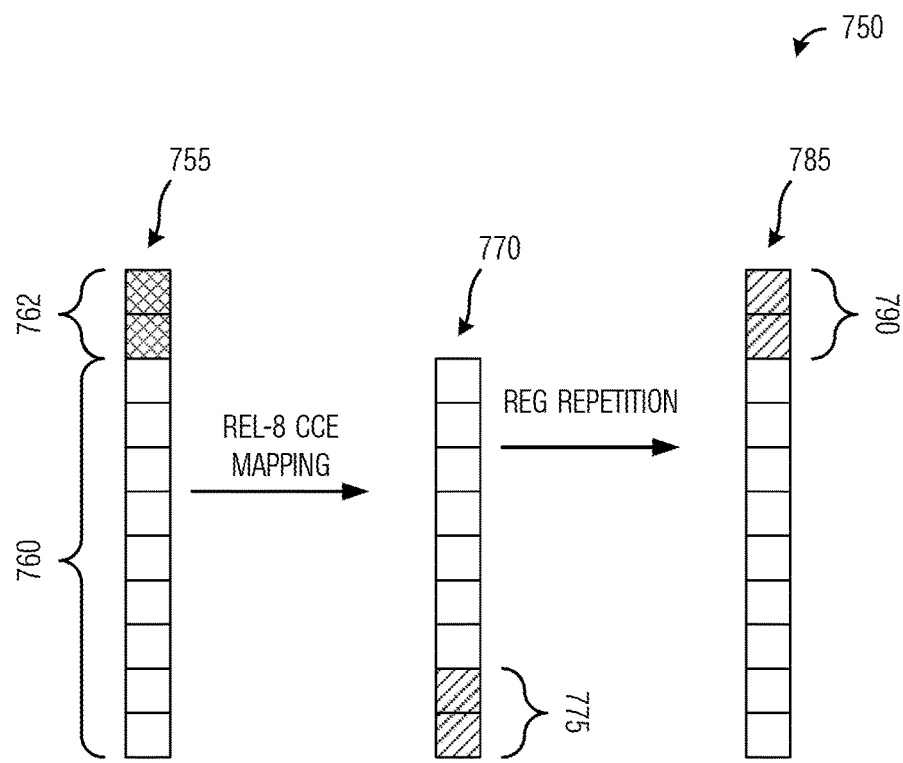
FIG. 7b illustrates an example diagram of an adaptation of the code rate of encoded information, wherein the adaptation comprises rate matching up according to example embodiments described herein.

FIG. 7b illustrates a diagram 750 of an adaptation of the code rate of encoded information, wherein the adaptation comprises rate matching up. For discussion purposes, consider an illustrative example of one CCE (9 REGs) being transmitted on one allocated RB (11 REGs). Although the example focuses on a single CCE being mapped onto a single RB, the example embodiments may be applied to any number of CCEs being mapped onto any number of RBs. FIG. 7b illustrates a sequence of blocks 755 that includes a first group of REGs 760, where first group of REGs includes 9 REGs corresponding to the CCE. Sequence of blocks 755 also includes a second group of REGs 763 that may correspond to 2 REGs remaining unallocated in the RB.

FIG. 7b also illustrates a sequence of blocks 770 that may correspond to the nine REGs of the CCE. Out of the nine REGs, two REGs (group of blocks 775) may be selected for duplication. As shown in FIG. 7b, group of blocks 775 may be the first two REGs of group of blocks 775, however, the example embodiments described herein may be operable with any two REGs in group of blocks 775. Therefore, the discussion of selecting the first two REGs for duplication should not be construed as being limiting to either the scope or the spirit of the example embodiments.

FIG. 7b also illustrates a sequence of blocks 785, wherein sequence of blocks 785 includes 11 REGs, which fully occupies a single RB. Group of blocks 790 illustrates the two REGs duplicated to entirely fill the 11 REGs of the single RB. Although shown in FIG. 7b as occupying the last two REGs in sequence of blocks 785, the blocks of group of blocks 790 may be located in any position in sequence of blocks 785. Therefore, the discussion of placing group of blocks 790 at the end of sequence of blocks 785 should not be construed as being limiting to either the scope or the spirit of the example embodiments.

While the rate matching up is described as occurring at the REG level, the rate matching up may be performed at other levels with minor adjustments, such as the RE level. For example, in a mode without cross interleaving: when a reference signal (RS) is configured in the R-PDCCH region, the corresponding REs that are related to the RS need to be accounted for when rate matching is performed. In such a situation, a rate matching down may be considered. The rate matching can occur after encoding, such as in FIG. 8, or according to FIG. 3b.

Generally, the rate matching up technique illustrated in FIG. 7b may be used for a R-PDCCH with cross-interleaving. Furthermore, the rate matching up technique may be applied before or after cross-interleaving.

Figures 1, 7C:
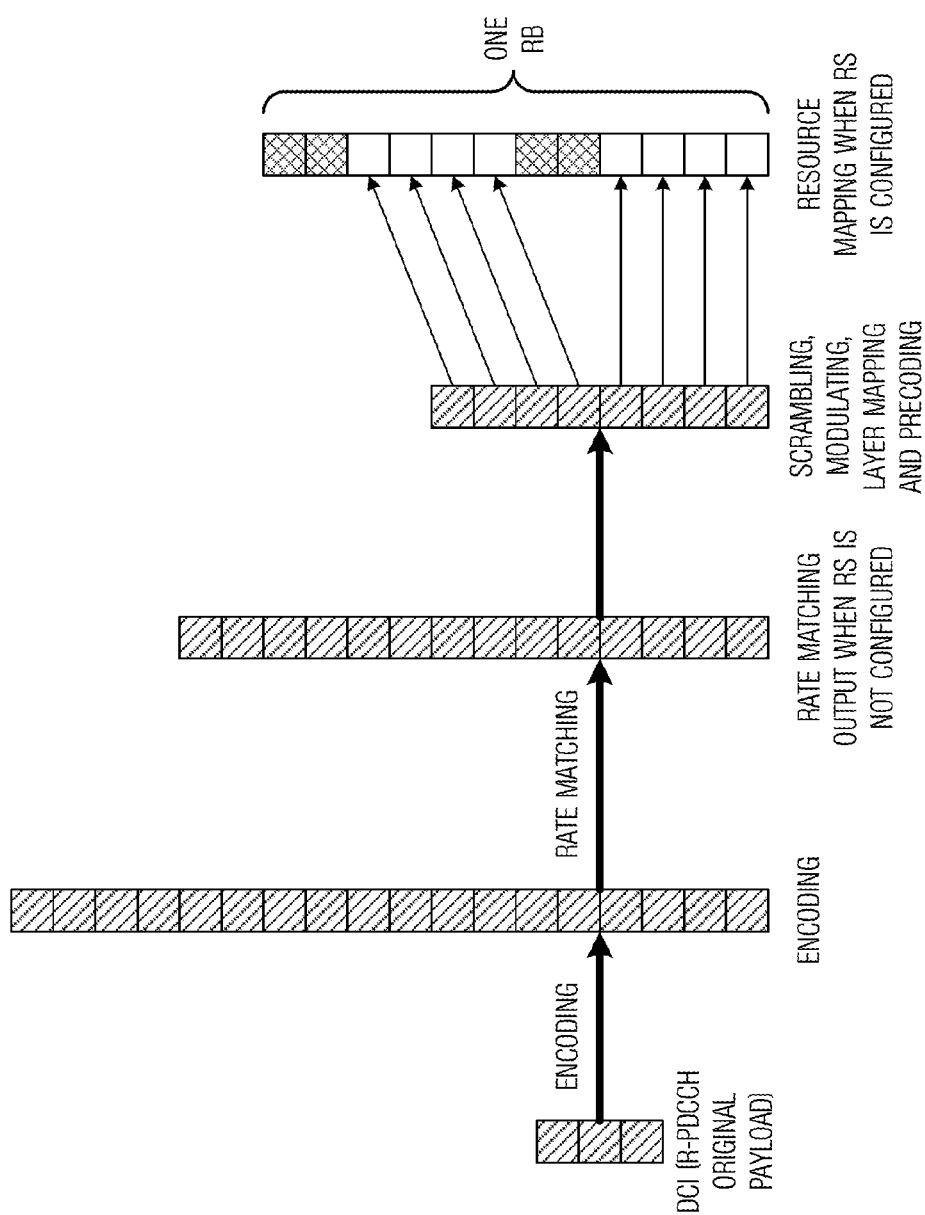
Figures 2, 7C:
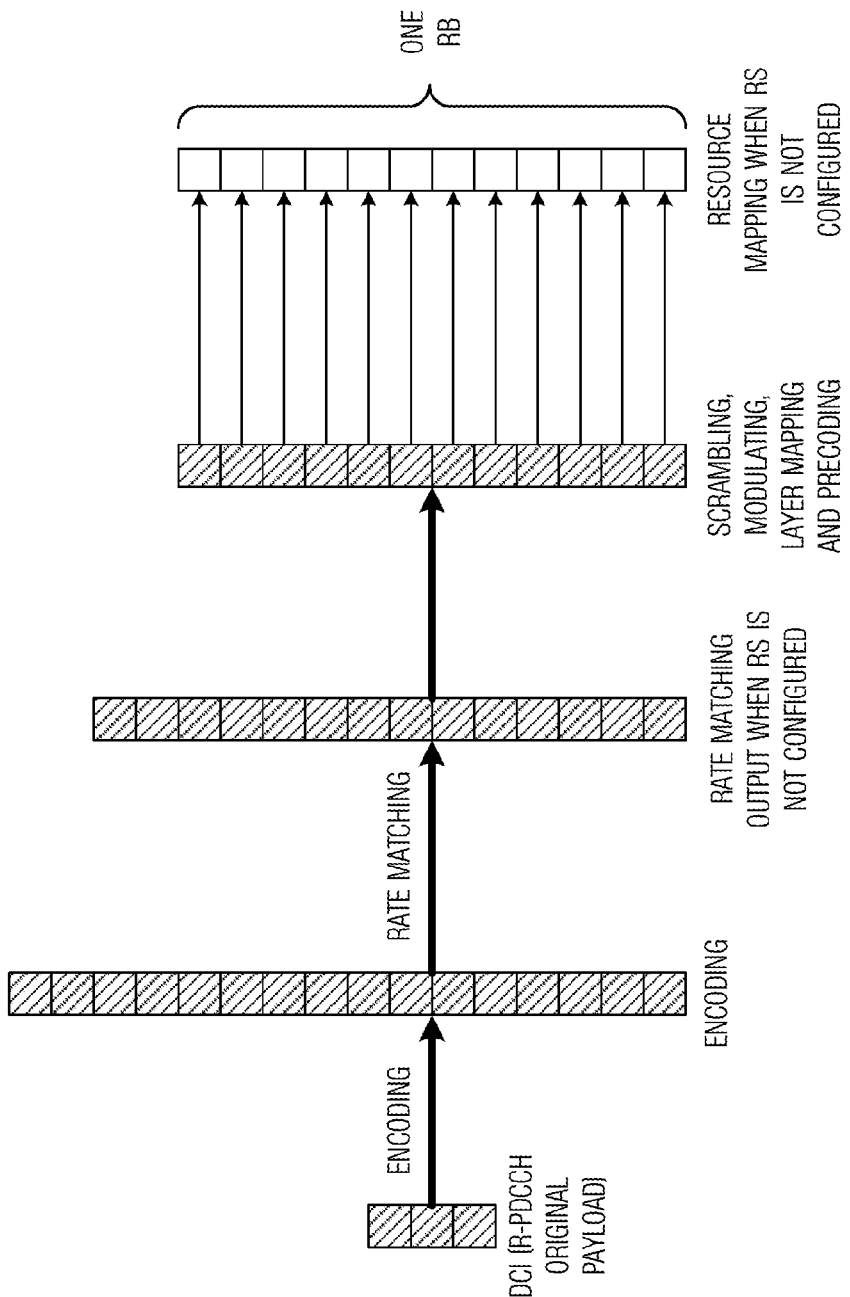

FIGS. 7c-1 and 7c-2 illustrate rate matching up techniques that may be used for a R-PDCCH with or without cross-interleaving. Furthermore, the rate matching up technique may be applied after encoding. The cross-hatched boxes indicate one RS configuration/assumption, when there is a RS configuration update, rate matching down or up may be used.

According to an example embodiment, the REGs selected for duplication may be selected from all R-PDCCHs before interleaving occurs until the RBs are fully occupied. By distributing the duplicated REGs between the R-PDCCHs, the unused resources may be well used for the R-PDCCH, thus allowing the transmission of the R-PDCCH with a lower code rate.

Figure 8:
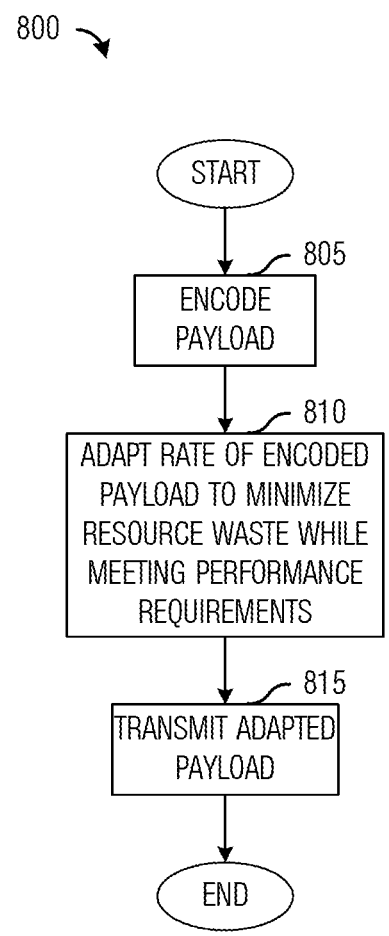
FIG. 8 illustrates an example flow diagram of eNB operations in transmitting a payload to a communications device, wherein the payload is code rate adapted to maximize resource utilization according to example embodiments described herein.

FIG. 8 illustrates a flow diagram of eNB operations 800 in transmitting a payload to a communications device, wherein the payload is code rate adapted to maximize resource utilization or to discount the REs not used for control channel transmission, e.g., R-PDCCH in the assigned RBs. eNB operations 800 may be indicative of operations occurring in an eNB as the eNB transmits a payload on a channel, such as a control channel (e.g., a R-PDCCH), a data channel, or so on, to a communications device, where the eNB has performed code rate adaptation to maximize resource utilization. The communications device may be a RN and/or a UE. eNB operations 800 may occur while the eNB is in a normal operating mode.

eNB operations 800 may begin with the eNB encoding a payload with a code at a code rate (block 805). According to an example embodiment, the code used to encode the payload may have a code rate that is specified or determined by code parameters, such as available resources, desired error performance, communications system load, size of payload, a total amount of transmissions to be transmitted, eNB priority, communications device priority, quality of service requirements, and so forth.

After encoding, the encoded payload may be mapped onto a number of resources, for example, RBs, based on an amount of payload to be transmitted. Preferably, the mapping should be made so that available resources are fully (or substantially fully) occupied. However, in many cases, the amount of payload to be transmitted will usually not fully occupy the resources used for transmission. For example, when some reference signals are configured, the code rate from the rate matching adaptation has to be accounted. This case can occur, e.g., when cross-interleaving of R-PDCCH is not performed.

Unoccupied resources may result in a waste of the resources, as well as potentially subpar detection performance. The eNB may adapt the rate of the encoded payload (block 810). The adaptation of the encoded payload may help to reduce resource waste as well as improve performance, for example, detection performance, error performance, and so forth. According to an example embodiment, the adaptation of the encoded payload, e.g., rate matching up or rate matching down the encoded payload may be based on a comparison of an amount of adaptation required with a maximum code rate and/or a minimum code rate, for example. Again, the adaptation of the rate of the encoded payload may be performed so that available resources are fully (or substantially fully) occupied.

For example, consider a resource allocation scenario wherein an encoded payload may be rate matched up to a code rate of $R_{UP}$ or rate matched down to a code rate of $R_{DOWN}$. In general, unless $R_{DOWN}$ fails to meet a minimum code rate, then the encoded payload may be rate matched down since rate matching down may free up more resources for use in other transmissions. However, if rate matching down results in a code rate $R_{DOWN}$ that is higher than the maximum code rate, then the encoded payload may be rate matched up to ensure that the encoded payload meets minimum performance requirements. The values of $R_{UP}$ or $R_{DOWN}$ may depend on the individual user, quality of service (QoS), spectrum efficiency targets, and so forth.

According to an example embodiment, adaptation of the rate of the encoded payload may be based on a resource utilization factor, which may be defined as a ratio of a number of resources needed to transmit the encoded payload to a number of resources allocated to transmit the encoded payload. Therefore, to maximize the resource utilization factor, the number of resources needed to transmit the encoded payload and the number of resources allocated to transmit the encoded payload should be equal (i.e., the resource utilization factor is equal to one).

As an example, if the resource utilization factor is equal to one, then adaptation of the encoded payload may not be necessary. However, if the resource utilization factor is less than one, then adaptation of the encoded payload may be performed to increase the resource utilization factor. If adaptation of the encoded payload is needed (i.e., the resource utilization factor is less than one), then the code rate of the encoded payload may be used to determine if the encoded payload should be rate matched up or rate matched down.

If the resource utilization factor is not substantially less than one, for example, less than 5 or 10 percent difference between the resource utilization factor and one, then adaptation of the code rate may not be performed since gains may be offset by overhead required in adaptation, signaling, and so forth. The value of the difference may be specified, preset, or dynamically determined. For example, the difference may be determined based on an amount of overhead required in adaptation, signaling, and so forth. Therefore, for situations wherein there is low adaptation, signaling, or so on, overhead, the difference may be set to a smaller value.

Generally, due to resource utilization priorities, it may be preferred to perform rate matching down to adapt the encoded payload as long as the rate matched down payload still meets a maximum code rate to ensure desired performance. If rate matching down the encoded payload does not result in a payload that meets the maximum code rate, then rate matching up may be performed.

After adaptation, the adapted payload may be transmitted (block 815).

Figures 9A, 9B:
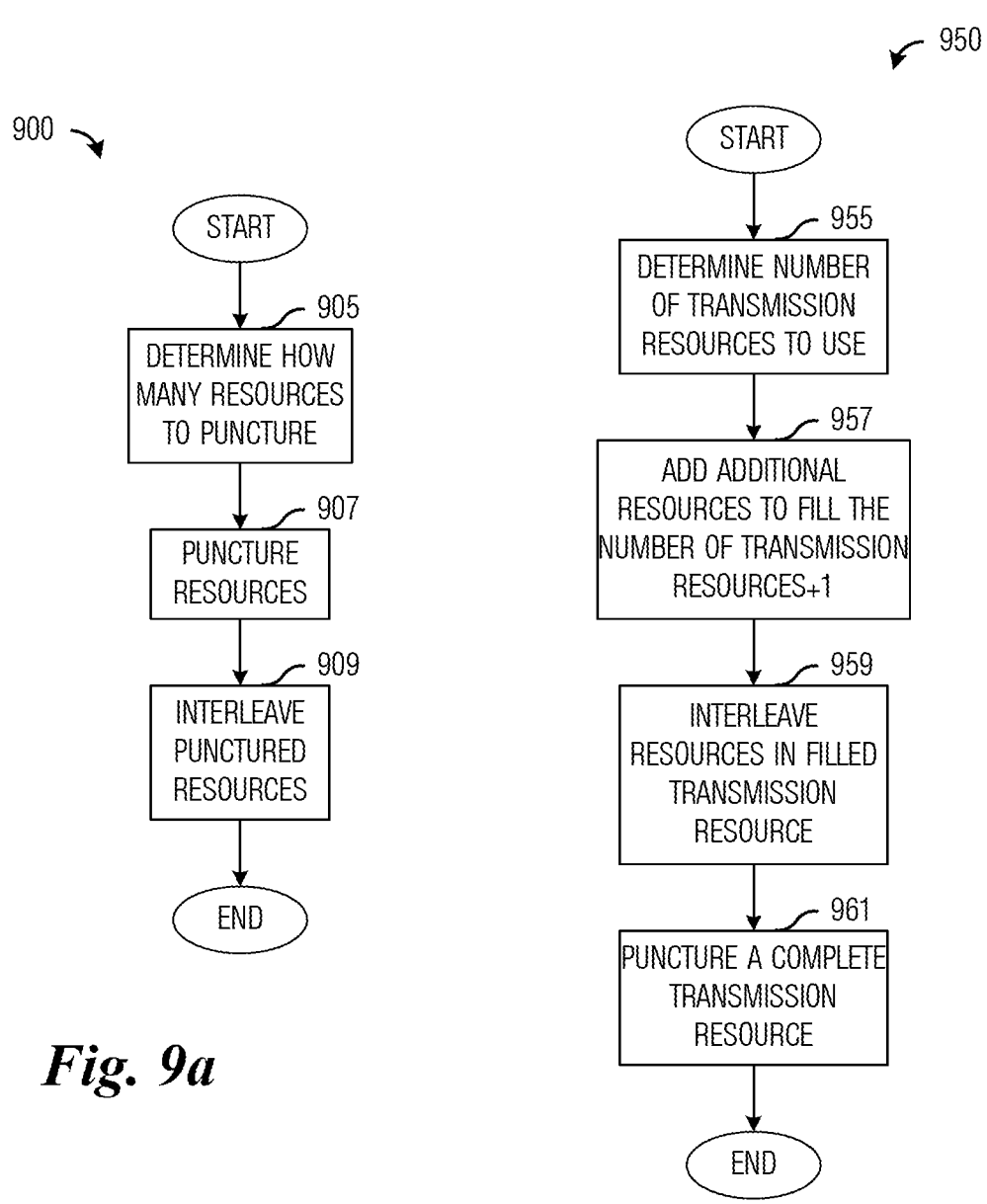
FIG. 9a illustrates an example flow diagram of eNB operations in rate matching down an encoded payload, wherein the rate matching down occurs prior to interleaving the encoded payload according to example embodiments described herein.
FIG. 9b illustrates an example flow diagram of eNB operations in rate matching down an encoded payload, wherein the rate matching down occurs after interleaving the encoded payload according to example embodiments described herein.

FIG. 9a illustrates a flow diagram of eNB operations 900 in rate matching down an encoded payload, wherein the rate matching down occurs prior to interleaving the encoded payload. eNB operations 900 may be indicative of operations occurring in an eNB as the eNB performs a rate matching down to reduce the code rate of an encoded payload to increase resource utilization. eNB operations 900 may occur while the eNB is in a normal operating mode.

eNB operations 900 may begin with the eNB determining how many resources, e.g., REGs or RBs, to puncture (block 905). According to an example embodiment, a number of resources to puncture may be based on a number of resources, e.g., REs, REGs, or RBs, to transmit as well as a number of transmission resources, e.g., RBs, allocated to transmit the encoded payload. Furthermore, a number of resources to puncture may also be dependent on a maximum code rate or a maximum puncture ratio. For example, depending on a resource allocation scenario, multiple numbers of resources to puncture, but only a subset thereof may result in an adapted payload that meets the maximum code rate or the maximum puncture ratio. The eNB may select the number of resources to puncture based on selection criteria, such as the number of resources, the number of transmission resources, the maximum code rate, the maximum puncture ratio, or a combination thereof.

The eNB may puncture the resource (block 907). According to an example, the eNB may puncture the resources in manner that is as evenly distributed as possible to minimize the code rate impact on any one encoded payload. For example, if the puncturing is not performed as evenly as possible, some encoded payloads may be severely impacted while others minimally impacted.

The punctured payloads may be interleaved (block 909). Interleaving may be optional depending on a design of a communications system. As an example, in configurations without cross-interleaving, interleaving may not be applied to the punctured payloads. The example embodiments, as described herein may be operable with or without interleaving.

FIG. 9b illustrates a flow diagram of eNB operations 950 in rate matching down an encoded payload, wherein the rate matching down occurs after interleaving the encoded payload. eNB operations 950 may be indicative of operations occurring in an eNB as the eNB performs a rate matching down to reduce the code rate of an encoded payload to increase resource utilization. eNB operations 950 may occur while the eNB is in a normal operating mode.

eNB operations 950 may being with the eNB determining how many transmission resources are needed to transmit the encoded payload(s) (block 955). According to an example embodiment, the eNB may determine the number of transmission resources needed to transmit the encoded payload on a maximum code rate or a maximum puncture ratio. For example, depending on a resource allocation scenario, multiple numbers of transmission resources may exist, but only a subset thereof may result in an adapted payload that meets the minimum code rate or the maximum puncture ratio. The eNB may select the number of transmission resources based on selection criteria, such as the number of resources, the number of transmission resources, the minimum code rate, the maximum puncture ratio, or a combination thereof.

The eNB may add additional resources (e.g., REGs) to the encoded payload to fill the number of transmission resources plus a specified number of transmission resources, such as one, for example, thereby producing an augmented payload (block 957). The additional transmission resources may comprise additional encoded channel bits, repeated bits, bits of a specified value(s), and so forth. According to a specified number of transmission resources may be specified by an operator of the communications system, a standards body, or so on. As an example, if the number of number of transmission resources is two, then the eNB may add additional resources to fill three (two+one) transmission resources.

The eNB may interleave the augmented payload (block 959). The eNB may puncture as many entire transmission resources as needed to bring the augmented payload back down in size to the number of transmission resources (block 961). As an example, if the specified number of transmission resource is one, then the eNB may puncture one entire transmission resource.

Figure 10:
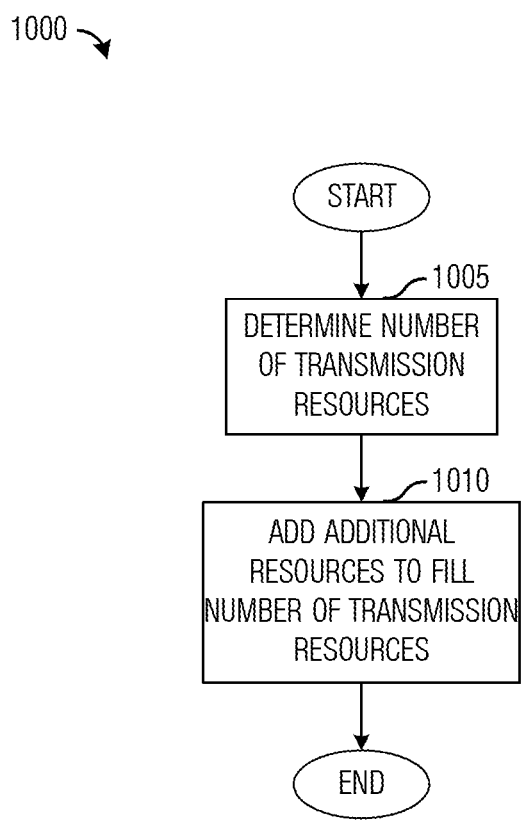
FIG. 10 illustrates an example flow diagram of eNB operations in rate matching up an encoded payload according to example embodiments described herein.

FIG. 10 illustrates a flow diagram of eNB operations 1000 in rate matching up an encoded payload. eNB operations 1000 may be indicative of operations occurring in an eNB as the eNB performs a rate matching up to reduce the code rate of an encoded payload to increase resource utilization. eNB operations 1000 may occur while the eNB is in a normal operating mode.

eNB operations 1000 may begin with the eNB determining a number of transmission resources, e.g., resource blocks, to use to transmit the encoded payload (block 1005). According to an example embodiment, the number of transmission resources may be based on the encoded payload, as well as a number of other selection factors, such as a desired code rate, a minimum code rate, a desired error performance, communications system traffic, eNB priority, communications device priority, and so forth. As an example, the eNB may select the number of transmission resources to be equal to a number of allocated transmission resources or the number of allocated transmission resources plus a specified number of transmission resources, which ever may happen to be a smallest number of transmission resources that meets the selection factors.

The eNB may add additional resources to fill the number of transmission resources (block 1010). According to an example embodiment, the eNB may simply fill with the transmission resources not allocated to the encoded payload with a specified value. Alternatively, the eNB may duplicate portions of the encoded payload to fill the transmission resources. The eNB may distribute the duplication of the encoded payload so as different portions of the encoded payload are as equally represented as much as possible.

An issue rated to adapting the code rate of an encoded payload is detection. One technique to assist in detection to perform detection is to indicate adapting the code rate with resource allocation of a channel, such as R-PDCCH, before and/or after adapting the code rate with signaling. Another technique is to utilize blind detection.

When adapting the code rate is not performed, the detection of the channel, e.g., R-PDCCH, may occur of the resource (e.g., two resource blocks as in FIGS. 5 and 6, generalized to $N_A$). When adapting the code rate is performed, the detection of the channel, e.g., R-PDCCH, may occur from the resource (e.g., two resource blocks as in FIGS. 5 and 6, generalized to $N_A$), furthermore, if no channel (R-PDCCH) is detected, further blind detection may be performed until the resource (three resource blocks in FIGS. 5 and 6, generalized to $N_A+M_{MAX}$) to find the channel (R-PDCCH).

Consider an illustrative example wherein each RB comprises 12 subcarriers and 7 symbols for a normal cyclic prefix length. Therefore, there is a total of 84 available REs. The REs that are used for transmitting a reference signal(s) may be excluded. Furthermore, REs used for control channels, such as PDCCH, and so on, as well as other overhead, e.g., guard symbols, may be excluded. Therefore, it may be possible to determine a number of available REs per RB that may be used to transmit a payload(s).

An eNB may know what is the best modulation and coding rate for a particular RN to use. Therefore, the eNB may be able to derive a number of channel bits and modulation symbols needed. Hence, the eNB may be able to derive a number of RBs to use. According to 3GPP TS 36.104 v8.7.0, Table 6.3.1.1-1, a RE in an assigned RB cannot be transmitted with zero power, therefore, it has to be occupied, thereby implying that all assigned RBs need to be fully filled (utilized).

Therefore, it may be possible to achieve detection by exhaustively performing blind detection over all possible resource mapping assumptions. However, bind detection complexity may increase along with increased number of possible resource mapping assumptions (or defined puncture ratio values). Blind detection for adapting the code rate of R-PDCCH may be used for a variety of R-PDCCHs.

Figure 11D:
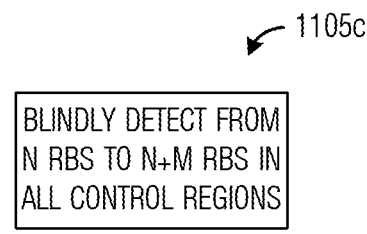

FIG. 11*a* illustrates a flow diagram of relay node (RN) operations 1100 in decoding a transmission. The discussion of FIG. 11*a* (as well as FIGS. 11*b*, 11*c*, 11*d*, and 11*e*) focuses on detecting a R-PDCCH, which is a control channel specifically for use with RNs. However, the example embodiments presented herein may be operable with a variety of communications devices and channels. RN operations 1100 may be indicative of operations occurring in an RN as the RN, detects and decodes a R-PDCCH to determine where to detect transmissions targeted to the RN. RN operations 1100 may occur while the RN is in a normal operating mode.

RN operations 1100 may begin with the RN detecting the R-PDCCH (block 1105). Detecting the R-PDCCH may be performed using blind detection with a search space for the R-PDCCH being dependent on the possible resource mapping assumptions.

The RN may decode the R-PDCCH (block 1110) and based on the decoded R-PDCCH, the RN may determine where to detect transmissions targeted to the RN, i.e., determine a location of its R-PDSCH (block 1115).

The RN may detect its R-PDSCH (block 1120) and decode the detected R-PDSCH (block 1125).

FIG. 11*b* illustrates a flow diagram of RN operations 1105*a* in a first technique for detecting the R-PDCCH. According to an example embodiment, the first technique involves a control region for all or part of R-PDCCHs. The R-PDCCHs of all RNs or part of RNs are in the control region. From each RN, there may be one control region. From a donor eNB side, there can be one or more than one control region. For the cross-interleaved R-PDCCH, RB-level puncturing down can be used for the control region. Typically, an interleaving depth may still be set as the control region length, although this is not mandatory. After interleaving with rate matching is used, the interleaving depth can be the control region length or less than the control region length or the RB subset length of the control region, although some other depths can be considered as well. Multiple of PRB level puncturing or multiple of PRB level rate matching down is typically used for simplicity, but is not mandatory. Each RN may do blind detection from N RBs to N+M RBs according to predefined puncture level, e.g., PRB, N can be the predefined RB region length or RB subset length, N+M can be equal or less than the length of one control region or the total length of all control regions.

Figure 11E:
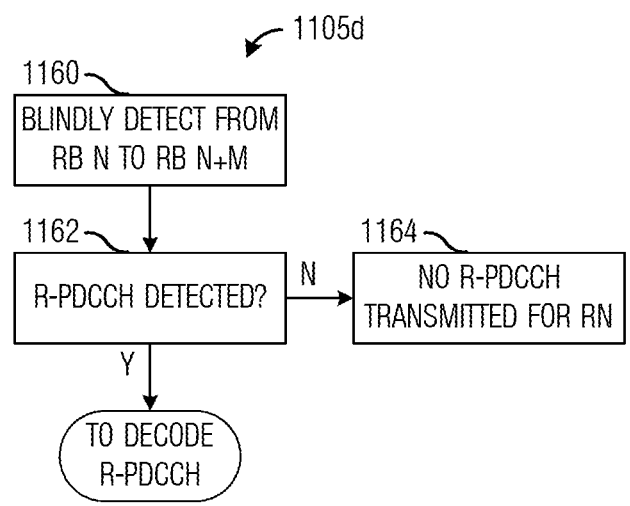

FIG. 11e illustrates a flow diagram of RN operations 1105b in a second technique for detecting the R-PDCCH. According to an example embodiment, the second technique involves a control region is semi-statically signaled to all RN which can potentially be used for all the interleaved R-PDCCH. However, the actually used R-PDCCH can be a subset of the control region, all RN R-PDCCH is interleaved within such control region. The subsets can have the granularity of PRBs, e.g., 2, 4, 8, or so forth, which may be predefined. If the required resource for RN R-PDCCH is not in such subset, there can be several methods for mapping:

Method 1: Just mapping the R-PDCCH in the subset with PRBs larger than the required PRBs;

Method 2: A rate matching method is used to further improve the resource efficiency.

The method 2 may include: first ceiling the required R-PDCCH resource, e.g., in PRB level, then punctured the R-PDCCH to the nearest PRB lower than the value of ceiling the required PRBs. When it comes to the de-rate matching, each RN can first detect the predefined RB set N (block 1150), if the RN can not detect the R-PDCCH (block 1152), then blind detection from N to N+M may be performed (block 1154). M can be the RB value less than the near predefined RB set size.

FIG. 11d illustrates a flow diagram of RN operations 1105c in a third technique for detecting the R-PDCCH. According to an example embodiment, the third technique involves more than one control region and each RN can see more than one control region. For each R-PDCCH, its interleaving depth is within the each of the separate control region. For R-PDCCH detection, each RN can perform the blind detection of all control regions. In each region, similar as above, each RN can perform the blind detection from N RBs to N+M RBs until it detect the R-PDCCH.

According to an example embodiment, a fourth technique for detecting the R-PDCCH involves a RN specific R-PDCCH. Each R-PDCCH is assigned in one or more PRBs when R-PDCCH is in different CCE aggregation level, e.g., 1, 2, 4, 8 or so on. Similarly, rate matching can be used for R-PDCCH to improve the resource efficiency. When the required resource is less than one RB, repetition can be used to fill (occupy) the whole RB, and the repetition can be at the CCE, REG, and/or RE level. The repetition can be performed in certain sequences, e.g. from the beginning REG until the unused resources are occupied (or substantially occupied). For the detection, on the contrary, RN can first detect according to CCE then blindly detect with REG and/or RE repetition.

Another rate matching method for RN specific R-PDCCH may be to use RB as the R-PDCCH allocation granularity, the function can be similar as CCE, and the difference is that one R-PDCCH DL grant and/or UL grant is mapped to one or multiple of RBs. The resource mapping of R-PDCCH DL grant and/or UL grant in the RB or multiple of RBs can be in sequence: after coding and modulation, the R-PDCCH DL grant and/or UL grant symbols are mapped onto the available REs for control in sequence, rate matching can be used to occupy all or almost all of the allocated resources for the R-PDCCH DL grant and/or UL grant. The rate matching not only takes into account the different number of RBs in the RB level aggregation, but also a RS overhead to adapt the code rate.

FIG. 11e illustrates a flow diagram of RN operations 1105d in a fifth technique for detecting the R-PDCCH. For the detection of RN specific R-PDCCH with RB as the allocation granularity, when M is the configured or predefined control region, blind detection may be applied to the M RBs (block 1160), with one or multiple RBs as the blind detection granularity. If the R-PDCCH is detected (block 1162), then the R-PDCCH may then be decoded. If the R-PDCCH is not detected, then the RN may determine that no R-PDCCH intended for the RN was transmitted (block 1164). When N is the starting RB of the configured or predefined control region, blind detection is applied to from N to N+M RB, with one or multiple RBs as the blind detection granularity. The blind detection region is M RBs for this case.

Figure 12:
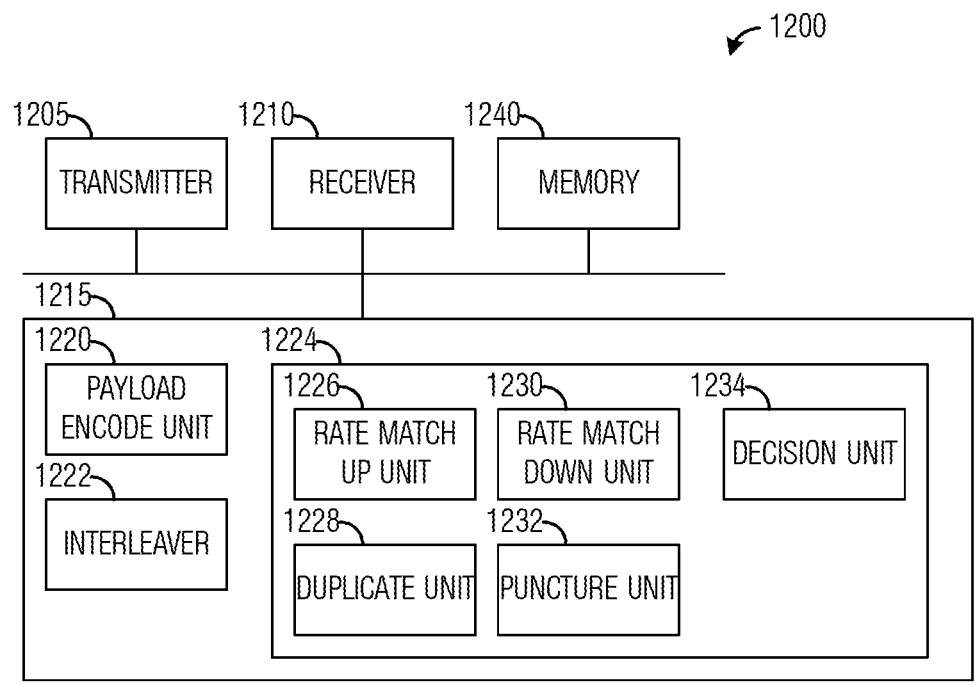
FIG. 12 provides an example communications device according to example embodiments described herein.

FIG. 12 provides an alternate illustration of a communications device 1200. Communications device 1200 may be an implementation of a communications device, such as an eNB. Communications device 1200 may be used to implement various ones of the embodiments discussed herein. As shown in FIG. 12, a transmitter 1205 is configured to transmit information and a receiver 1210 that is configured to receive information and indications.

A payload encode unit 1220 is configured to encode a payload with a code at a determined code rate. An interleaver 1222 is configured to interleave a payload provided at its input based on a specified interleaving pattern. As an example, an encoded payload from payload encode unit 1220 may be interleaved by interleaver 1222.

An adaptation unit 1224 is configured to adapt an encoded payload based on a resource allocation scenario. Adaptation performed by adaptation unit 1224 is based on allocated resources as well as factors such as maximum code rate, minimum code rate, puncture ratio, and so forth.

Adaptation unit 1224 includes a rate match up unit 1226 that is configured to increase a code rate of the encoded data. Rate match up unit 1226 increases the code rate by increasing a number of resources used to transmit the encoded data. Rate match up unit 1226 is configured to determine a proposed number of transmit resources to transmit the encoded data. A duplicate unit 1228 is configured to duplicate resources in the encoded data to increase the code rate.

Adaptation unit 1224 also includes a rate match down unit 1230 that is configured to decrease a code rate of the encoded data. Rate match down unit 1230 decreases the code rate by reducing a number of resources used to transmit the encoded data. Rate match down unit 1230 is configured to determine a number of resources to puncture. A puncture unit 1232 is configured to eliminate resources in the encoded data to decrease the code rate.

A decision unit 1234 is configured to determine which way to adapt the encoded data, for example, to rate match up or rate match down the encoded data. A memory 1240 is configured to store encoded data, puncture ratios, maximum code rates, minimum code rates, and so forth.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, receiver 1210 and transmitter 1205 may be implemented as a specific hardware block, while payload encode unit 1220, interleaver 1222, and adaptation unit 1224 (rate match up unit 1226, duplicate unit 1228, rate match down unit 1230, puncture unit 1232, and decision unit 1234) may be software modules executing in a microprocessor (such as processor 1215) or a custom circuit or a custom compiled logic array of a field programmable logic array.

Figure 13:
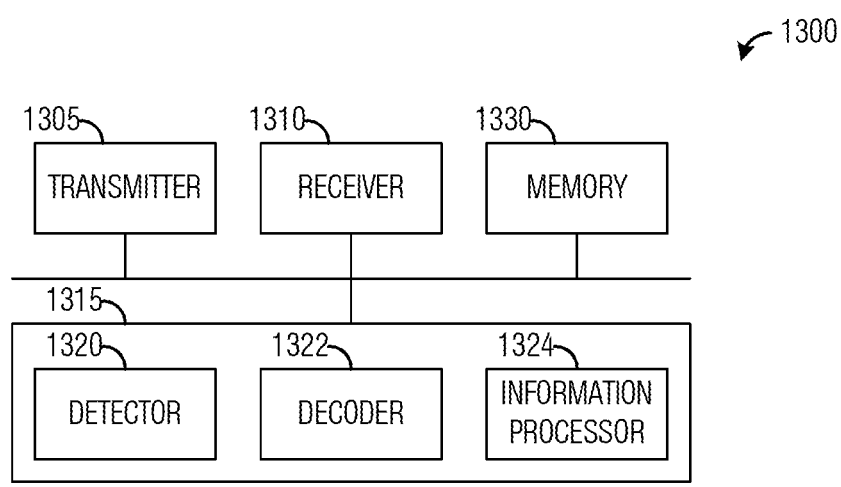
FIG. 13 provides an example communications device according to example embodiments described herein.

FIG. 13 provides an alternate illustration of a communications device 1300. Communications device 1300 may be an implementation of a communications device, such as a RN or UE. Communications device 1300 may be used to implement various ones of the embodiments discussed herein. As shown in FIG. 13, a transmitter 1305 is configured to transmit information and a receiver 1310 that is configured to receive information and indications.

A detector 1320 is configured to detect a potentially rate match adapted transmission using blind detection. Detector 1320 may detect for the transmission in different search spaces based on a configuration of the control region for the transmission. A decoder 1322 is configured to decode an encoded payload in the detected transmission. An information processor 1324 is configured to process information in the decoded payload. Information processor 1324 may process the decoded payload to determine where to detect for further transmissions to communications device 1300. A memory 1330 is configured to store encoded data, puncture ratios, maximum code rates, minimum code rates, and so forth.

The elements of communications device 1300 may be implemented as specific hardware logic blocks. In an alternative, the elements of communications device 1300 may be implemented as software executing in a processor, controller, application specific integrated circuit, or so on. In yet another alternative, the elements of communications device 1300 may be implemented as a combination of software and/or hardware.

As an example, receiver 1310 and transmitter 1305 may be implemented as a specific hardware block, while detector 1320, decoder 1322, and information processor 1324 may be software modules executing in a microprocessor (such as processor 1315) or a custom circuit or a custom compiled logic array of a field programmable logic array.

The above described embodiments of communications device 1200 and communications device 1300 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 3*a*, 3*b*, 8, 9*a*, 9*b*, 10, 11*a*, 11*b*, 11*c*, 11*d*, and 11*e*—is used to indicate the desired specific use (or non-use) of such terms.

Advantageous features of embodiments of the invention may include: A method for a first communication device to transmit a resource assignment to at least one communication device, the method comprising: assigning at least one transmission resource to transmit the resource assignment; adapting a code rate of an encoded payload based on the at least one transmission resource and a threshold, thereby producing an adapted payload; and transmitting the adapted payload.

The method could further include, wherein the information duplicated from the encoded payload is selected from an evenly distributed manner from the encoded payload. The method could further include, further comprising interleaving the encoded payload. The method could further include, further comprising interleaving the adapted payload. The method could further include, wherein adapting the code rate down further comprises interleaving the punctured payload. The method could further include, wherein the resources punctured are distributed evenly throughout the encoded payload. The method could further include, wherein the additional resources contain information duplicated from the encoded payload.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for a first communication device to transmit a resource assignment to at least one communication device, the method comprising:
   assigning at least one transmission resource to transmit the resource assignment;
   determining a down code rate;
   in response to the down code rate being less than a first threshold comprising a code rate threshold, adapting a code rate of an encoded payload up in accordance with the at least one transmission resource, thereby producing an adapted payload, the adapting the code rate up comprising:
      determining a proposed number of resources to transmit the encoded payload; and
      adding additional resources to the encoded payload to fill resources between the proposed number of resources to transmit the encoded payload and a number of resources allocated to transmit the encoded payload; and
   transmitting the adapted payload.

2. The method of claim 1, wherein the first threshold further comprises a spectral efficiency threshold, a signal to interference plus noise ratio threshold, a signal to noise ratio threshold, or combinations thereof.

3. The method of claim 1, wherein the first communication device is an enhanced NodeB (eNB).

4. The method of claim 1, wherein the at least one communication device receiving the resource assignment comprises a relay node.

5. The method of claim 1, wherein the resource assignment is received by a single communications device.

6. The method of claim 1, wherein the at least one transmission resource is substantially fully occupied.

7. The method of claim 1, wherein there are at least two transmission resources, and wherein the at least two transmission resources are consecutive virtual resource blocks.

8. The method of claim 7, when the consecutive virtual resource blocks are further mapped to physical resource blocks.

9. The method of claim 1, wherein adapting the code rate is further in accordance with a resource utilization factor comprising a ratio of a number of resources needed to transmit the encoded payload to a number of resources allocated to transmit the encoded payload.

10. The method of claim 9, wherein adapting the code rate further comprises:
determining the resource utilization factor for the encoded payload; and
adapting the code rate of the encoded payload in accordance with the resource utilization factor not being substantially equal to a first value.

11. A method for a first communication device to transmit a resource assignment to at least one communication device, the method comprising:
assigning at least one transmission resource to transmit the resource assignment;
determining a down code rate;
in response to the down code rate being greater than a first threshold comprising a code rate threshold, adapting a code rate of an encoded payload down in accordance with the at least one transmission resource, thereby producing an adapted payload, the adapting the code rate down comprising:
determining a proposed number of resources to transmit the encoded payload; and
adding additional resources to the encoded payload to fill resources between the proposed number of resources to transmit the encoded payload and a number of resources allocated to transmit the encoded payload; and
transmitting the adapted payload.

12. The method of claim 11, wherein the first threshold further comprises a spectral efficiency threshold, a signal to interference plus noise ratio threshold, a signal to noise ratio threshold, or combinations thereof.

13. The method of claim 11, wherein the first communication device is an enhanced NodeB (eNB).

14. The method of claim 11, wherein the at least one communication device receiving the resource assignment comprises a relay node.

15. The method of claim 11, wherein the resource assignment is received by a single communications device.

16. The method of claim 11, wherein the at least one transmission resource is substantially fully occupied.

17. The method of claim 11, wherein there are at least two transmission resources, and wherein the at least two transmission resources are consecutive virtual resource blocks.

18. The method of claim 17, when the consecutive virtual resource blocks are further mapped to physical resource blocks.

19. The method of claim 11, wherein adapting the code rate is further in accordance with a resource utilization factor comprising a ratio of a number of resources needed to transmit the encoded payload to a number of resources allocated to transmit the encoded payload.

20. The method of claim 19, wherein adapting the code rate further comprises:
determining the resource utilization factor for the encoded payload; and
adapting the code rate of the encoded payload in accordance with the resource utilization factor not being substantially equal to a first value.

21. The method of claim 11, wherein a filled payload comprises the encoded payload with the added additional resources, the method further comprising:
interleaving the filled payload, thereby producing an interleaved payload; and
puncturing the interleaved payload to produce the adaptive payload comprising the number of resources allocated to transmit the encoded payload.

* * * * *